H. W. Southworth,
Horseshoe Pad.
Nº 81,025.   Patented Aug. 11, 1868.
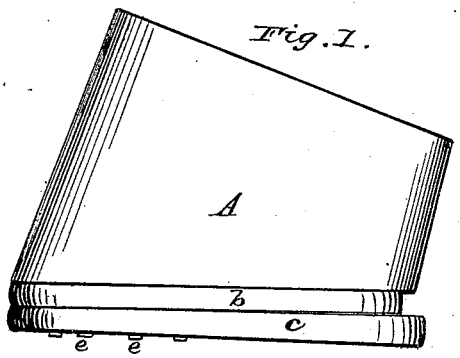
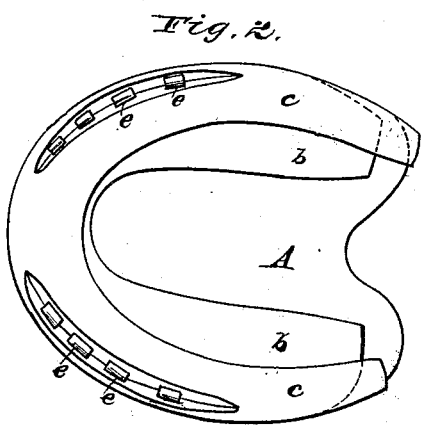
Witnesses:
J. A. Curtis.
F. E. Rice.
Inventor.
H. W. Southworth

United States Patent Office.

H. W. SOUTHWORTH, OF MITTINEAGUE, MASSACHUSETTS.

Letters Patent No. 81,025, dated August 11, 1868.

IMPROVEMENT IN PADS FOR HORSES' HOOFS.

The Schedule referred to in these Letters Patent and making part of the same.

TO ALL WHOM IT MAY CONCERN:

Be it known that I, H. W. SOUTHWORTH, of Mittineague, in the county of Hampden, and Commonwealth of Massachusetts, have invented a new and useful Improved Cushion for Horses' Shoes; and I do hereby declare that the following is a full, clear, and exact description thereof, reference being had to the accompanying drawings, making a part of this specification, and to the letters of reference marked thereon, in which—

Figure 1 represents a side view of a hoof with my invention applied.

Figure 2 represents the bottom of a hoof with my invention applied.

The nature of my invention consists in the construction of a raw-hide cushion, to be placed between horses' hoofs and the shoes, whereby the hoof is kept in a healthy condition, while the elasticity of such cushions of raw hide relieves the horse's feet of any feeling of tenderness or soreness which they may have acquired from any cause.

The use of cushions between the shoe and hoof has long been known and practised, but as yet none have been made or used which seem to meet all the requirements which it is desirable such an article should possess, from the fact that those which are made too elastic "throw" the shoe, or cause the nails to start more or less from the hoof.

Cushions made of India rubber, or vulcanized rubber, have been extensively used, but these are found to "draw" or heat, and this heating is a very prevalent cause of disease and tenderness in horses' feet. To avoid this drawing or heating of the feet, cushions of leather have been used, but these are found objectionable, inasmuch as the acids, tannin, &c., used in the various processes of tanning the leather, always remain to a greater or less extent in the leather, and, when such leather cushions are used, it is found that the hoof absorbs certain portions of the acids, tannin, &c., remaining in the leather, thus injuring the hoof, and inducing disease in the feet.

It is well known that there exists a large proportion of gelatine or gelatinous matter in the hoofs of horses, and that one great cause of diseased and tender feet in horses is, that the hoofs, from various causes, become dry and hard, and lose, to some extent, their natural elasticity, which elasticity, in a healthy hoof, is due principally to the presence of gelatine.

To overcome the objections contingent upon the use of rubber, leather, &c., I make the cushions of raw hide, as that article is tenacious, elastic, and well adapted to the purpose, and contains a very large proportion of gelatine; and thus I apply, for the cure and prevention of diseased and tender feet, the article itself which enters so largely into the composition of the hoof in its natural and healthy state.

I find that cushions made of raw hide are kept sufficiently moist and pliable from common use to render them peculiarly adapted to this purpose, and they also impart a portion of their gelatinous moisture to the hoof, which absorbs more or less of all the gelatinous properties of the raw hide, and the hoof is thus restored to its natural healthy condition.

The cushion, represented at $b\ b$ in fig. 2, may be formed either by moulding, cut out with a knife, stamped out by means of a die, or formed by any other suitable means from raw hide in any of its forms, and of the proper thickness, and the cushion thus formed is applied to the hoof, the shoe $c$ applied over it, and the nails $e\ e$ driven through the shoe and cushion into the hoof in the usual manner.

Having thus described my invention, what I claim as new, and desire to secure by Letters Patent, is—

The raw-hide cushion for horses' shoes, constructed substantially as herein described, and for the purposes specified.

H. W. SOUTHWORTH.

Witnesses:
T. A. CURTIS,
F. E. RICE.